(12) United States Patent
Kliner

(10) Patent No.: US 10,901,162 B2
(45) Date of Patent: *Jan. 26, 2021

(54) BACK-REFLECTION PROTECTION AND MONITORING IN FIBER AND FIBER-DELIVERED LASERS

(71) Applicant: nLIGHT, Inc., Vancouver, WA (US)

(72) Inventor: Dahv A. V. Kliner, Portland, OR (US)

(73) Assignee: nLIGHT, Inc., Vancouver, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/417,337

(22) Filed: May 20, 2019

(65) Prior Publication Data

US 2020/0064573 A1 Feb. 27, 2020

Related U.S. Application Data

(63) Continuation of application No. 14/816,211, filed on Aug. 3, 2015, now Pat. No. 10,310,201.

(Continued)

(51) Int. Cl.
*G02B 6/42* (2006.01)
*G02B 6/14* (2006.01)
(Continued)

(52) U.S. Cl.
CPC .......... *G02B 6/4296* (2013.01); *H01S 3/0064* (2013.01); *H01S 3/094007* (2013.01); *G02B 6/14* (2013.01); *G02B 2006/4297* (2013.01); *H01S 3/005* (2013.01); *H01S 3/0014* (2013.01); *H01S 3/067* (2013.01)

(58) Field of Classification Search
None
See application file for complete search history.

(56) References Cited

U.S. PATENT DOCUMENTS

| 3,388,461 A | 6/1968 | Lins |
| 4,138,190 A | 2/1979 | Bryngdahl |

(Continued)

FOREIGN PATENT DOCUMENTS

| CN | 102448623 | 5/2012 |
| CN | 102844942 | 12/2012 |

(Continued)

OTHER PUBLICATIONS

Adelman et al., "Measurement of Relative State-to-State Rate Constants for the Reaction D+$H_2$(v, j)→HD(v', j')+H," *J. Chem. Phys.*, 97:7323-7341 (Nov. 15, 1992).

(Continued)

*Primary Examiner* — Michelle R Connelly
(74) *Attorney, Agent, or Firm* — Klarquist Sparkman, LLP

(57) ABSTRACT

A system includes an optical fiber situated to propagate a laser beam received from a laser source to an output of the optical fiber, a first cladding light stripper optically coupled to the optical fiber and situated to extract at least a portion of forward-propagating cladding light in the optical fiber, and a second cladding light stripper optically coupled to the optical fiber between the first cladding light stripper and the optical fiber output and situated to extract at least a portion of backward-propagating cladding light in the optical fiber.

20 Claims, 3 Drawing Sheets

Related U.S. Application Data

(60) Provisional application No. 62/032,043, filed on Aug. 1, 2014.

(51) Int. Cl.
  *H01S 3/094* (2006.01)
  *H01S 3/00* (2006.01)
  *H01S 3/067* (2006.01)

(56) References Cited

U.S. PATENT DOCUMENTS

| | | | |
|---|---|---|---|
| 4,252,403 | A | 2/1981 | Salisbury |
| 4,266,851 | A | 5/1981 | Salisbury |
| 4,475,027 | A | 10/1984 | Pressley |
| 4,475,789 | A | 10/1984 | Kahn |
| 4,713,518 | A | 12/1987 | Yamazaki et al. |
| 4,863,538 | A | 9/1989 | Deckard |
| 4,998,797 | A | 3/1991 | van den Bergh et al. |
| 5,008,555 | A | 4/1991 | Mundy |
| 5,153,773 | A | 10/1992 | Muraki et al. |
| 5,252,991 | A | 10/1993 | Storlie et al. |
| 5,319,195 | A * | 6/1994 | Jones .............. B23K 26/032 219/121.62 |
| 5,463,497 | A | 10/1995 | Muraki et al. |
| 5,475,415 | A | 12/1995 | Noethen |
| 5,509,597 | A | 4/1996 | Laferriere |
| 5,523,543 | A | 6/1996 | Hunter, Jr. et al. |
| 5,745,284 | A | 4/1998 | Goldberg et al. |
| 5,748,824 | A | 5/1998 | Smith |
| 5,818,630 | A | 10/1998 | Fermann et al. |
| 5,864,430 | A | 1/1999 | Dickey et al. |
| 5,903,696 | A | 5/1999 | Krivoshlykov |
| 5,909,306 | A | 6/1999 | Goldberg et al. |
| 5,932,119 | A | 8/1999 | Kaplan et al. |
| 5,986,807 | A | 11/1999 | Fork |
| 5,999,548 | A | 12/1999 | Mori et al. |
| 6,072,184 | A | 6/2000 | Okino et al. |
| 6,132,104 | A | 10/2000 | Bliss et al. |
| 6,265,710 | B1 | 7/2001 | Walter |
| 6,330,382 | B1 | 12/2001 | Harshbarger et al. |
| RE37,585 | E | 3/2002 | Mourou et al. |
| 6,353,203 | B1 | 3/2002 | Hokodate et al. |
| 6,362,004 | B1 | 3/2002 | Noblett |
| 6,426,840 | B1 | 7/2002 | Partanen et al. |
| 6,433,301 | B1 | 8/2002 | Dunsky et al. |
| 6,434,177 | B1 | 8/2002 | Jurgensen |
| 6,483,973 | B1 | 11/2002 | Mazzarese et al. |
| 6,490,376 | B1 | 12/2002 | Au et al. |
| 6,496,301 | B1 | 12/2002 | Koplow et al. |
| 6,542,665 | B2 | 4/2003 | Reed et al. |
| 6,556,340 | B1 | 4/2003 | Wysocki et al. |
| 6,577,314 | B1 | 6/2003 | Yoshida et al. |
| 6,639,177 | B2 | 10/2003 | Ehrmann et al. |
| 6,671,293 | B2 | 12/2003 | Kopp et al. |
| 6,711,918 | B1 | 3/2004 | Kliner et al. |
| 6,724,528 | B2 | 4/2004 | Koplow et al. |
| 6,772,611 | B2 | 8/2004 | Kliner et al. |
| 6,777,645 | B2 | 8/2004 | Ehrmann et al. |
| 6,779,364 | B2 | 8/2004 | Tankala et al. |
| 6,801,550 | B1 | 10/2004 | Snell et al. |
| 6,825,974 | B2 | 11/2004 | Kliner et al. |
| 6,839,163 | B1 | 1/2005 | Jakobson et al. |
| 6,882,786 | B1 | 4/2005 | Kliner et al. |
| 6,895,154 | B2 | 5/2005 | Johnson et al. |
| 6,917,742 | B2 | 7/2005 | Po |
| 6,941,053 | B2 | 9/2005 | Lauzon et al. |
| 6,963,062 | B2 | 11/2005 | Cyr et al. |
| 6,989,508 | B2 | 1/2006 | Ehrmann et al. |
| 7,068,900 | B2 | 6/2006 | Croteau et al. |
| 7,079,566 | B2 | 7/2006 | Kido et al. |
| 7,099,533 | B1 | 8/2006 | Chenard |
| 7,116,887 | B2 | 10/2006 | Farroni et al. |
| 7,146,073 | B2 | 12/2006 | Wan |
| 7,148,447 | B2 | 12/2006 | Ehrmann et al. |
| 7,151,787 | B2 | 12/2006 | Kulp et al. |
| 7,157,661 | B2 | 1/2007 | Amako |
| 7,170,913 | B2 | 1/2007 | Araujo et al. |
| 7,184,630 | B2 | 2/2007 | Kwon et al. |
| 7,235,150 | B2 | 6/2007 | Bischel et al. |
| 7,257,293 | B1 | 8/2007 | Fini et al. |
| 7,317,857 | B2 | 1/2008 | Manyam et al. |
| 7,349,123 | B2 | 3/2008 | Clarke et al. |
| 7,359,604 | B2 | 4/2008 | Po |
| 7,373,070 | B2 | 5/2008 | Wetter et al. |
| 7,382,389 | B2 | 6/2008 | Cordingley et al. |
| 7,394,476 | B2 | 7/2008 | Cordingley et al. |
| 7,421,175 | B2 | 9/2008 | Varnham |
| 7,463,805 | B2 | 12/2008 | Li et al. |
| 7,526,166 | B2 | 4/2009 | Bookbinder et al. |
| 7,527,977 | B1 | 5/2009 | Fruetel et al. |
| 7,537,395 | B2 | 5/2009 | Savage-Leuchs |
| 7,592,568 | B2 | 9/2009 | Varnham et al. |
| 7,593,435 | B2 | 9/2009 | Gapontsev et al. |
| 7,748,913 | B2 | 7/2010 | Oba |
| 7,764,854 | B2 | 7/2010 | Fini |
| 7,781,778 | B2 | 8/2010 | Moon et al. |
| 7,783,149 | B2 | 8/2010 | Fini |
| 7,835,608 | B2 | 11/2010 | Minelly et al. |
| 7,839,901 | B2 | 11/2010 | Meleshkevich et al. |
| 7,876,495 | B1 | 1/2011 | Minelly |
| 7,880,961 | B1 | 2/2011 | Feve et al. |
| 7,920,767 | B2 | 4/2011 | Fini |
| 7,924,500 | B1 | 4/2011 | Minelly |
| 7,925,125 | B2 | 4/2011 | Cyr et al. |
| 7,955,905 | B2 | 6/2011 | Cordingley et al. |
| 7,955,906 | B2 | 6/2011 | Cordingley et al. |
| 8,027,555 | B1 | 9/2011 | Kliner et al. |
| 8,071,912 | B2 | 12/2011 | Costin, Sr. et al. |
| 8,217,304 | B2 | 7/2012 | Cordingley et al. |
| 8,237,788 | B2 | 8/2012 | Cooper et al. |
| 8,243,764 | B2 | 8/2012 | Tucker et al. |
| 8,251,475 | B2 | 8/2012 | Murray et al. |
| 8,269,108 | B2 | 9/2012 | Kunishi et al. |
| 8,270,441 | B2 | 9/2012 | Rogers et al. |
| 8,270,445 | B2 | 9/2012 | Morasse et al. |
| 8,278,591 | B2 | 10/2012 | Chouf et al. |
| 8,288,683 | B2 | 10/2012 | Jennings et al. |
| 8,310,009 | B2 | 11/2012 | Saran et al. |
| 8,317,413 | B2 | 11/2012 | Fisher et al. |
| 8,362,391 | B2 | 1/2013 | Partlo et al. |
| 8,395,084 | B2 | 3/2013 | Tanaka |
| 8,414,264 | B2 | 4/2013 | Bolms et al. |
| 8,433,161 | B2 | 4/2013 | Langseth et al. |
| 8,442,303 | B2 | 5/2013 | Cheng et al. |
| 8,472,099 | B2 | 6/2013 | Fujino et al. |
| 8,509,577 | B2 | 8/2013 | Liu |
| 8,526,110 | B1 | 9/2013 | Honea et al. |
| 8,537,871 | B2 | 9/2013 | Saracco |
| 8,542,145 | B2 | 9/2013 | Galati |
| 8,542,971 | B2 | 9/2013 | Chatigny |
| 8,593,725 | B2 | 11/2013 | Kliner et al. |
| 8,711,471 | B2 | 4/2014 | Liu et al. |
| 8,728,591 | B2 | 5/2014 | Inada et al. |
| 8,755,649 | B2 | 6/2014 | Yilmaz et al. |
| 8,755,660 | B1 | 6/2014 | Minelly |
| 8,774,237 | B2 | 7/2014 | Maryashin et al. |
| 8,781,269 | B2 | 7/2014 | Huber et al. |
| 8,809,734 | B2 | 8/2014 | Cordingley et al. |
| 8,835,804 | B2 | 9/2014 | Farmer et al. |
| 8,873,134 | B2 | 10/2014 | Price et al. |
| 8,947,768 | B2 | 2/2015 | Kliner et al. |
| 8,948,218 | B2 | 2/2015 | Gapontsev et al. |
| 8,953,914 | B2 | 2/2015 | Genier |
| 9,014,220 | B2 | 4/2015 | Minelly et al. |
| 9,136,663 | B2 | 9/2015 | Taya |
| 9,140,873 | B2 | 9/2015 | Minelly |
| 9,158,066 | B2 | 10/2015 | Fini et al. |
| 9,170,359 | B2 | 10/2015 | Van Bommel et al. |
| 9,207,395 | B2 | 12/2015 | Fini et al. |
| 9,217,825 | B2 | 12/2015 | Ye et al. |
| 9,250,390 | B2 | 2/2016 | Muendel et al. |
| 9,310,560 | B2 | 4/2016 | Chann et al. |
| 9,322,989 | B2 | 4/2016 | Fini et al. |
| 9,325,151 | B1 | 4/2016 | Fini et al. |

(56) References Cited

U.S. PATENT DOCUMENTS

| | | |
|---|---|---|
| 9,339,890 B2 | 5/2016 | Woods et al. |
| 9,366,887 B2 | 6/2016 | Tayebati et al. |
| 9,397,466 B2 | 7/2016 | McComb et al. |
| 9,431,786 B2 | 8/2016 | Savage-Leuchs |
| 9,442,252 B2 | 9/2016 | Genier |
| 9,507,084 B2 | 12/2016 | Fini et al. |
| 9,537,042 B2 | 1/2017 | Dittli et al. |
| 9,547,121 B2 | 1/2017 | Hou et al. |
| 9,634,462 B2 | 4/2017 | Kliner et al. |
| 9,837,783 B2 | 12/2017 | Kliner et al. |
| 10,310,201 B2 * | 6/2019 | Kliner ............... H01S 3/0064 |
| 2001/0050364 A1 | 12/2001 | Tanaka et al. |
| 2002/0097963 A1 | 7/2002 | Ukechi et al. |
| 2002/0146202 A1 | 10/2002 | Reed et al. |
| 2002/0158052 A1 | 10/2002 | Ehrmann et al. |
| 2002/0176676 A1 | 11/2002 | Johnson et al. |
| 2003/0031407 A1 | 2/2003 | Weisberg et al. |
| 2003/0059184 A1 | 3/2003 | Tankala et al. |
| 2003/0095578 A1 | 5/2003 | Kopp et al. |
| 2003/0118305 A1 | 6/2003 | Reed et al. |
| 2003/0213998 A1 | 11/2003 | Hsu et al. |
| 2003/0219208 A1 | 11/2003 | Kwon et al. |
| 2004/0013379 A1 | 1/2004 | Johnson et al. |
| 2004/0086245 A1 | 5/2004 | Farroni et al. |
| 2004/0112634 A1 | 6/2004 | Tanaka et al. |
| 2004/0207936 A1 | 10/2004 | Yamamoto et al. |
| 2004/0208464 A1 | 10/2004 | Po |
| 2005/0002607 A1 | 1/2005 | Neuhaus et al. |
| 2005/0027288 A1 | 2/2005 | Oyagi et al. |
| 2005/0041697 A1 | 2/2005 | Seifert et al. |
| 2005/0168847 A1 | 8/2005 | Sasaki |
| 2005/0185892 A1 | 8/2005 | Kwon et al. |
| 2005/0233557 A1 | 10/2005 | Tanaka et al. |
| 2005/0259944 A1 | 11/2005 | Anderson et al. |
| 2005/0265678 A1 | 12/2005 | Manyam et al. |
| 2005/0271340 A1 | 12/2005 | Weisberg et al. |
| 2006/0013532 A1 | 1/2006 | Wan |
| 2006/0024001 A1 | 2/2006 | Kobayashi |
| 2006/0054606 A1 | 3/2006 | Amako |
| 2006/0067632 A1 | 3/2006 | Broeng et al. |
| 2006/0219673 A1 | 10/2006 | Varnham et al. |
| 2006/0275705 A1 | 12/2006 | Dorogy et al. |
| 2006/0291788 A1 | 12/2006 | Po |
| 2007/0075060 A1 | 4/2007 | Shedlov et al. |
| 2007/0104436 A1 | 5/2007 | Li et al. |
| 2007/0104438 A1 | 5/2007 | Varnham |
| 2007/0147751 A1 | 6/2007 | Fini |
| 2007/0178674 A1 | 8/2007 | Imai et al. |
| 2007/0195850 A1 | 8/2007 | Schluter et al. |
| 2007/0215820 A1 | 9/2007 | Cordingley et al. |
| 2008/0037604 A1 | 2/2008 | Savage-Leuchs |
| 2008/0141724 A1 | 6/2008 | Fuflyigin |
| 2008/0181567 A1 | 7/2008 | Bookbinder et al. |
| 2008/0246024 A1 | 10/2008 | Touwslager et al. |
| 2009/0034059 A1 | 2/2009 | Fini |
| 2009/0059353 A1 | 3/2009 | Fini |
| 2009/0080835 A1 | 3/2009 | Frith |
| 2009/0122377 A1 | 5/2009 | Wagner |
| 2009/0127477 A1 | 5/2009 | Tanaka et al. |
| 2009/0152247 A1 | 6/2009 | Jennings et al. |
| 2009/0154512 A1 | 6/2009 | Simons et al. |
| 2009/0175301 A1 | 7/2009 | Li et al. |
| 2009/0274833 A1 | 11/2009 | Li |
| 2009/0297108 A1 | 12/2009 | Ushiwata et al. |
| 2009/0314752 A1 | 12/2009 | Manens et al. |
| 2010/0025387 A1 | 2/2010 | Arai et al. |
| 2010/0067013 A1 | 3/2010 | Howieson et al. |
| 2010/0067860 A1 | 3/2010 | Ikeda et al. |
| 2010/0129029 A1 | 5/2010 | Westbrook |
| 2010/0150186 A1 | 6/2010 | Mizuuchi |
| 2010/0163537 A1 | 7/2010 | Furuta et al. |
| 2010/0225974 A1 | 9/2010 | Sandstrom |
| 2010/0230665 A1 | 9/2010 | Verschuren et al. |
| 2011/0058250 A1 | 3/2011 | Liu et al. |
| 2011/0080476 A1 | 4/2011 | Dinauer et al. |
| 2011/0091155 A1 | 4/2011 | Yilmaz et al. |
| 2011/0127697 A1 | 6/2011 | Milne |
| 2011/0133365 A1 | 6/2011 | Ushimaru et al. |
| 2011/0163077 A1 | 7/2011 | Partlo et al. |
| 2011/0187025 A1 | 8/2011 | Costin, Sr. |
| 2011/0248005 A1 | 10/2011 | Briand et al. |
| 2011/0278277 A1 | 11/2011 | Stork Genannt Wersborg |
| 2011/0279826 A1 | 11/2011 | Miura et al. |
| 2011/0297229 A1 | 12/2011 | Gu et al. |
| 2011/0305256 A1 | 12/2011 | Chann |
| 2012/0002919 A1 | 1/2012 | Liu |
| 2012/0051084 A1 | 3/2012 | Yalin et al. |
| 2012/0051692 A1 | 3/2012 | Seo |
| 2012/0082410 A1 | 4/2012 | Peng et al. |
| 2012/0127097 A1 | 5/2012 | Gaynor et al. |
| 2012/0145685 A1 | 6/2012 | Ream et al. |
| 2012/0148823 A1 | 6/2012 | Chu |
| 2012/0156458 A1 | 6/2012 | Chu |
| 2012/0168411 A1 | 7/2012 | Farmer et al. |
| 2012/0262781 A1 | 10/2012 | Price et al. |
| 2012/0295071 A1 | 11/2012 | Sato |
| 2012/0301733 A1 | 11/2012 | Eckert et al. |
| 2012/0301737 A1 | 11/2012 | Labelle et al. |
| 2012/0321262 A1 | 12/2012 | Goell et al. |
| 2012/0329974 A1 | 12/2012 | Inada et al. |
| 2013/0005139 A1 | 1/2013 | Krasnov et al. |
| 2013/0022754 A1 | 1/2013 | Bennett et al. |
| 2013/0023086 A1 | 1/2013 | Chikama et al. |
| 2013/0027648 A1 | 1/2013 | Moriwaki |
| 2013/0038923 A1 | 2/2013 | Jespersen et al. |
| 2013/0087694 A1 | 4/2013 | Creeden et al. |
| 2013/0095260 A1 | 4/2013 | Bovatsek et al. |
| 2013/0146569 A1 | 6/2013 | Woods et al. |
| 2013/0148925 A1 | 6/2013 | Muendel et al. |
| 2013/0182725 A1 | 7/2013 | Karlsen et al. |
| 2013/0223792 A1 | 8/2013 | Huber et al. |
| 2013/0228442 A1 | 9/2013 | Mohaptatra et al. |
| 2013/0251324 A1 | 9/2013 | Fini et al. |
| 2013/0272657 A1 | 10/2013 | Salokatve |
| 2013/0299468 A1 | 11/2013 | Unrath et al. |
| 2013/0308661 A1 * | 11/2013 | Nishimura .......... H01S 3/06733 372/6 |
| 2013/0343703 A1 | 12/2013 | Genier |
| 2014/0044143 A1 | 2/2014 | Clarkson et al. |
| 2014/0086526 A1 | 3/2014 | Starodubov et al. |
| 2014/0104618 A1 | 4/2014 | Potsaid et al. |
| 2014/0155873 A1 | 6/2014 | Bor |
| 2014/0177038 A1 | 6/2014 | Rrataj et al. |
| 2014/0178023 A1 | 6/2014 | Oh et al. |
| 2014/0205236 A1 | 7/2014 | Noguchi et al. |
| 2014/0233900 A1 | 8/2014 | Hugonnot et al. |
| 2014/0241385 A1 | 8/2014 | Fomin et al. |
| 2014/0268310 A1 | 9/2014 | Ye et al. |
| 2014/0313513 A1 | 10/2014 | Liao |
| 2014/0332254 A1 | 11/2014 | Pellerite et al. |
| 2014/0333931 A1 | 11/2014 | Lu et al. |
| 2014/0334788 A1 | 11/2014 | Fini et al. |
| 2015/0049987 A1 | 2/2015 | Grasso et al. |
| 2015/0104139 A1 | 4/2015 | Brunet et al. |
| 2015/0125114 A1 | 5/2015 | Genier |
| 2015/0125115 A1 | 5/2015 | Genier |
| 2015/0138630 A1 | 5/2015 | Honea et al. |
| 2015/0165556 A1 | 6/2015 | Jones et al. |
| 2015/0241632 A1 | 8/2015 | Chann et al. |
| 2015/0293300 A1 | 10/2015 | Fini et al. |
| 2015/0293306 A1 | 10/2015 | Huber et al. |
| 2015/0316716 A1 | 11/2015 | Fini et al. |
| 2015/0331205 A1 | 11/2015 | Tayebati et al. |
| 2015/0349481 A1 | 12/2015 | Kliner |
| 2015/0352664 A1 | 12/2015 | Errico et al. |
| 2015/0378184 A1 | 12/2015 | Tayebati et al. |
| 2016/0013607 A1 | 1/2016 | McComb et al. |
| 2016/0059354 A1 | 3/2016 | Sercel et al. |
| 2016/0097903 A1 | 4/2016 | Li et al. |
| 2016/0104995 A1 * | 4/2016 | Savage-Leuchs ............... G02B 6/02347 359/341.4 |
| 2016/0111851 A1 | 4/2016 | Kliner et al. |
| 2016/0116679 A1 | 4/2016 | Muendel et al. |

(56) References Cited

U.S. PATENT DOCUMENTS

| | | | |
|---|---|---|---|
| 2016/0158889 | A1 | 6/2016 | Carter et al. |
| 2016/0187646 | A1 | 6/2016 | Ehrmann |
| 2016/0218476 | A1 | 7/2016 | Kliner et al. |
| 2016/0285227 | A1 | 9/2016 | Farrow et al. |
| 2016/0320565 | A1 | 11/2016 | Brown et al. |
| 2016/0320685 | A1 | 11/2016 | Tayebati et al. |
| 2016/0369332 | A1 | 12/2016 | Rothberg et al. |
| 2017/0090119 | A1 | 3/2017 | Logan et al. |
| 2017/0110845 | A1 | 4/2017 | Hou et al. |
| 2017/0162999 | A1 | 6/2017 | Saracco et al. |
| 2017/0271837 | A1 | 9/2017 | Hemenway et al. |
| 2017/0293084 | A1 | 10/2017 | Zhou et al. |
| 2017/0336580 | A1 | 11/2017 | Tayebati et al. |
| 2017/0363810 | A1 | 12/2017 | Holland et al. |
| 2018/0059343 | A1 | 3/2018 | Kliner |
| 2018/0203185 | A1 | 7/2018 | Farrow et al. |

FOREIGN PATENT DOCUMENTS

| | | |
|---|---|---|
| CN | 103490273 | 1/2014 |
| CN | 103606803 | 2/2014 |
| DE | 4200587 | 4/1993 |
| DE | 10321102 | 12/2004 |
| EP | 1266259 | 5/2011 |
| EP | 2587564 | 5/2013 |
| EP | 2642246 | 9/2013 |
| WO | WO 1995/011100 | 4/1995 |
| WO | WO 1995/011101 | 4/1995 |
| WO | WO 2004/027477 | 4/2004 |
| WO | WO 2012/102655 | 8/2012 |
| WO | WO 2013/090236 | 6/2013 |
| WO | WO 2017/008022 | 1/2017 |
| WO | WO 2017/136831 | 8/2017 |

OTHER PUBLICATIONS

Advisory Action from U.S. Appl. No. 15/607,410, dated Sep. 24, 2018, 6 pages.

Alcock et al., Element Table, *Canadian Metallurgical Quarterly*, 23:309-311 (1984).

Affine Transformation—from Wolfram MathWorld, http://mathworld.wolfram.com/AffineTransformation.html, downloaded Feb. 21, 2014, 2 pages.

Alfano et al., "Photodissociation and Recombination Dynamics of I2—in Solution," Ultrafast Phenomena VIII, (Springer-Verlag, New York), pp. 653-655 (Jan. 1993).

Applicant-Initiated Interview Summary from U.S. Appl. No. 15/607,399, dated May 25, 2018, 3 pages.

Applicant-Initiated Interview Summary from U.S. Appl. No. 15/607,399, dated Jul. 27, 2018, 9 pages.

Applicant-Initiated Interview Summary from U.S. Appl. No. 15/607,410, dated May 25, 2018, 3 pages.

Applicant-Initiated Interview Summary from U.S. Appl. No. 15/607,410, dated Jul. 24, 2018, 9 pages.

Applicant-Initiated Interview Summary from U.S. Appl. No. 15/607,411, dated Jan. 17, 2018, 2 pages.

Applicant-Initiated Interview Summary from U.S. Appl. No. 15/607,411, dated Sep. 12, 2018, 17 pages.

"ARM," Coherent, available at: http://www.corelase.fi/products/arm/, 6 pages, retrieved May 26, 2017.

Bernasconi et al., "Kinetics of Ionization of Nitromethane and Phenylnitromethane by Amines and Carboxylate Ions in Me2SO-Water Mixtures. Evidence of Ammonium Ion-Nitronate Ion Hydrogen Bonded Complex Formation in Me2SO-Rich Solvent Mixtures," *J. Org. Chem.*, 53:3342-3351 (Jul. 1988).

Blake et al., "The H+D2 Reaction: HD(v=1, J) and HD(v=2, J) Distributions at a Collision Energy of 1.3 eV," *Chem. Phys. Lett.*, 153:365-370 (Dec. 23, 1988).

Caprio, "Investigation of emission modes in the SLM of AISI 316L: modelling and process diagnosis," Ph.D. Thesis, Polytechnic University of Milan, 3 pages (Apr. 28, 2017).—Abstract only.

Daniel et al., "Novel technique for mode selection in a large-mode-area fiber laser," Conference on Lasers and Electro-Optics 2010, OSA Technical Digest (CD) (Optical Society of America), paper CWCS, 2 pages (Jan. 2010).

Daniel et al., "Novel technique for mode selection in a multimode fiber laser," *Optics Express*, 19:12434-12439 (Jun. 20, 2011).

Di Teodoro et al., "Diffraction-Limited, 300-kW Peak-Power Pulses from a Coiled Multimode Fiber Amplifier," *Optics Letters*, 27:518-520 (May 2002).

Di Teodoro et al., "Diffraction-limited, 300-kW-peak-power Pulses from a Yb-doped Fiber Amplifier," Conference on Lasers and Electro-Optics, OSA Technical Digest (Optical Society of America, Washington, DC), p. 592-593 (May 22-24, 2002).

Di Teodoro et al., "High-peak-power pulsed fiber sources," *Proc. of SPIE*, 5448:561-571 (Sep. 20, 2004).

"Efficient and Simple Precision, Laser Processing Head PDT-B," HIGHYAG, 6 pages, (Jan. 2010).

Eichenholz, "Photonic-crystal fibers have many uses," Optoelectronics World, 4 pages (Aug. 2004).

"ENSIS Series," Amada America, Inc., available at: http://www.amada.com/america/ensis-3015-aj, 2 pages, retrieved May 26, 2017.

"EX-F Series," MC Machinery Systems, Inc., available at: https://www.mcmachinery.com/products-and-solutions/ex-f-series/, 2 pages, retrieved May 26, 2017.

Farrow et al., "Bend-Loss Filtered, Large-Mode-Area Fiber Amplifiers: Experiments and Modeling," Proceedings of the Solid State and Diode Laser Technology Review (Directed Energy Professional Society), P-9, 5 pages (2006).

Farrow et al., "Compact Fiber Lasers for Efficient High-Power Generation," *Proc. of SPIE*, 6287:62870C-1-62870C-6 (Sep. 1, 2006).

Farrow et al., "Design of Refractive-Index and Rare-Earth-Dopant Distributions for Large-Mode-Area Fibers Used in Coiled High-Power Amplifiers," *Proc. of SPIE*, 6453:64531C-1-64531C-11 (Feb. 22, 2007).

Farrow et al., "High-Peak-Power (>1.2 MW) Pulsed Fiber Amplifier," *Proc. of the SPIE*, 6102:61020L-1-61020L-11 (Mar. 2006).

Farrow et al., "Numerical Modeling of Self-Focusing Beams in Fiber Amplifiers," *Proc. of the SPIE*, 6453:645309-1-645309-9 (2007).

Farrow et al., "Peak-Power Limits on Fiber Amplifiers Imposed by Self-Focusing," *Optics Lett.*, 31:3423-3425 (Dec. 1, 2006).

Fève et al., "Four-wave mixing in nanosecond pulsed fiber amplifiers," *Optics Express*, 15:4647-4662 (Apr. 16, 2007).

Fève et al., "Limiting Effects of Four-Wave Mixing in High-Power Pulsed Fiber Amplifiers," *Proc. of the SPIE*, 6453:64531P-1-64531P-11 (Feb. 22, 2007).

Final Office action from U.S. Appl. No. 15/607,411, dated Feb. 1, 2018, 27 pages.

Final Office action from U.S. Appl. No. 15/607,399, dated May 3, 2018, 31 pages.

Final Office action from U.S. Appl. No. 15/607,410, dated May 11, 2018, 29 pages.

Fini, "Bend-compensated design of large-mode-area fibers," *Optics Letters*, 31:1963-1965 (Jul. 1, 2006).

Fini, "Large mode area fibers with asymmetric bend compensation," *Optics Express*, 19:21866-21873 (Oct. 24, 2011).

Fini et al., "Bend-compensated large-mode-area fibers: achieving robust single-modedness with transformation optics," *Optics Express*, 21:19173-19179 (Aug. 12, 2013).

First Office Action from Chinese Application No. 201410455972.X, dated Jan. 26, 2016, 21 pages (with English translation).

First Office Action from Chinese Application No. 201480019324.8, dated Apr. 5, 2017, 20 pages (with English translation).

First Office Action for related Chinese Application No. 201610051671.X, dated Jun. 4, 2018, 25 pages (with English translation).

First Office Action for related Chinese Application No. 201510468218.4, dated Dec. 4, 2018, 14 pages (with English translation).

Fox et al., "Effect of low-earth orbit space on radiation-induced absorption in rare-earth-doped optical fibers," *J. Non-Cryst. Solids*, 378:79-88 (Oct. 15, 2013).

Fox et al., "Gamma Radiation Effects in Yb-Doped Optical Fiber," *Proc. of the SPIE*, 6453:645328-1-645328-9 (Feb. 23, 2007).

(56) References Cited

OTHER PUBLICATIONS

Fox et al., "Gamma-Radiation-Induced Photodarkening in Unpumped Optical Fibers Doped with Rare-Earth Constituents," *IEEE Trans. on Nuclear Science*, 57:1618-1625 (Jun. 2010).
Fox et al., "Investigation of radiation-induced photodarkening in passive erbium-, ytterbium-, and Yb/Er co-doped optical fibers," *Proc. of the SPIE*, 6713:67130R-1-67130R-9 (Sep. 26, 2007).
Fox et al., "Radiation damage effects in doped fiber materials," *Proc. of the SPIE*, 6873:68731F-1-68731F-9 (Feb. 22, 2008).
Fox et al., "Spectrally Resolved Transmission Loss in Gamma Irradiated Yb-Doped Optical Fibers," *IEEE J. Quant. Electron.*, 44:581-586 (Jun. 2008).
Fox et al., "Temperature and Dose-Rate Effects in Gamma Irradiated Rare-Earth Doped Fibers," *Proc. of SPIE*, 7095:70950B-1-70950B-8 (Aug. 26, 2008).
Ghasemi et al., "Beam shaping design for coupling high power diode laser stack to fiber," *Applied Optics*, 50:2927-2930 (Jun. 20, 2011).
Ghatak et al., "Design of Waveguide Refractive Index Profile to Obtain Flat Model Field," *SPIE*, 3666:40-44 (Apr. 1999).
Goers et al., "Development of a Compact Gas Imaging Sensor Employing cw Fiber-Amp-Pumped PPLN OPO," Conference on Lasers and Electro-Optics, OSA Technical Digest (Optical Society of America, Washington, DC), p. 521 (May 11, 2001).
Goldberg et al., "Deep UV Generation by Frequency Tripling and Quadrupling of a High-Power Modelocked Semiconductor Laser," Proceedings of the Quantum Electronics and Laser Science Conference, QPD18-2 (Baltimore) 2 pages (May 1995).
Goldberg et al., "Deep UV Generation by Frequency Quadrupling of a High-Power GaAlAs Semiconductor Laser," *Optics Lett.*, 20:1145-1147 (May 15, 1995).
Goldberg et al., "High Efficiency 3 W Side-Pumped Yb Fiber Amplifier and Laser," *Conference on Lasers and Electro-Optics*, OSA Technical Digest (Optical Society of America, Washington, DC), p. 11-12 (May 24, 1999).
Goldberg et al., "Highly Efficient 4-W Yb-Doped Fiber Amplifier Pumped by a Broad-Stripe Laser Diode," *Optics Lett.*, 24:673-675 (May 15, 1999).
Goldberg et al., "High-Power Superfluorescent Source with a Side-Pumped Yb-Doped Double-Cladding Fiber," *Optics Letters*, 23:1037-1039 (Jul. 1, 1998).
Goldberg et al., "Tunable UV Generation at 286 nm by Frequency Tripling of a High-Power Modelocked Semiconductor Laser," *Optics Lett.*, 20:1640-1642 (Aug. 1, 1995).
Golub, "Laser Beam Splitting by Diffractive Optics," Optics and Photonics News, 6 pages (Feb. 2004).
Han et al., "Reshaping collimated laser beams with Gaussian profile to uniform profiles," Applied Optics, 22:3644-3647 (Nov. 15, 1983).
Headrick et al., "Application of laser photofragmentation-resonance enhanced multiphoton ionization to ion mobility spectrometry," Applied Optics, 49:2204-2214 (Apr. 10, 2010).
Hemenway et al., "Advances in high-brightness fiber-coupled laser modules for pumping multi-kW CW fiber lasers," *Proceedings of SPIE*, 10086:1008605-1-1008605-7 (Feb. 22, 2017).
Hemenway et al., "High-brightness, fiber-coupled pump modules in fiber laser applications," *Proc. of SPIE*, 8961:89611V-1-89611V-12 (Mar. 7, 2014).
Hoops et al., "Detection of mercuric chloride by photofragment emission using a frequency-converted fiber amplifier," *Applied Optics*, 46:4008-4014 (Jul. 1, 2007).
Hotoleanu et al., "High Order Modes Suppression in Large Mode Area Active Fibers by Controlling the Radial Distribution of the Rare Earth Dopant," *Proc. of the SPIE*, 6102:61021T-1-61021T-8 (Feb. 23, 2006).
"How to Select a Beamsplitter," IDEX—Optics & Photonics Marketplace, available at: https://www.cvilaseroptics.com/file/general/beamSplitters.pdf, 5 pages (Jan. 8, 2014).
Huang et al., "Double-cutting beam shaping technique for high-power diode laser area light source," *Optical Engineering*, 52:106108-1-106108-6 (Oct. 2013).
Injeyan et al., "Introduction to Optical Fiber Lasers," *High-Power Laser Handbook*, pp. 436-439 (2011).
International Search Report and Written Opinion for International Application No. PCT/US2013/060470, 7 pages, dated Jan. 16, 2014.
International Search Report and Written Opinion for International Application No. PCT/US2014/017841, 5 pages, dated Jun. 5, 2014.
International Search Report and Written Opinion for International Application No. PCT/US2014/017836, 6 pages, dated Jun. 10, 2014.
International Search Report and Written Opinion for related International Application No. PCT/US2016/041526, 6 pages, dated Oct. 20, 2016.
International Search Report and Written Opinion for related International Application No. PCT/US2016/053807, 6 pages, dated Jan. 19, 2017.
International Search Report and Written Opinion for International Application No. PCT/US2016/063086, 6 pages, dated Mar. 23, 2017.
International Search Report and Written Opinion for International Application No. PCT/US2017/014182, 9 pages, dated Mar. 31, 2017.
International Search Report and Written Opinion from International Application No. PCT/US2017/034848, dated Nov. 28, 2017, 15 pages.
International Search Report and Written Opinion from International Application No. PCT/US2018/024908, dated Jul. 19, 2018, 8 pages.
International Search Report and Written Opinion for International Application No. PCT/US2018/026110, 12 pages, dated Aug. 8, 2018.
International Search Report and Written Opinion from International Application No. PCT/US2018/024904, dated Aug. 30, 2018, 5 pages.
Ishiguro et al., "High Efficiency 4-kW Fiber Laser Cutting Machine," Rev. Laser Eng., 39:680-684 (May 21, 2011).
Java—Transform a triangle to another triangle—Stack Overflow, http://stackoverflow.com/questions/1114257/transform-a-triangle-to-another-triangle?lq=1, downloaded Feb. 21, 2014, 3 pages.
Johnson et al., "Experimental and Theoretical Study of Inhomogeneous Electron Transfer in Betaine: Comparisons of Measured and Predicted Spectral Dynamics," Chem. Phys., 176:555-574 (Oct. 15, 1993).
Johnson et al., "Ultrafast Experiments on the Role of Vibrational Modes in Electron Transfer," *Pure and Applied Chem.*, 64:1219-1224 (May 1992).
Kliner, "Novel, High-Brightness, Fibre Laser Platform for kW Materials Processing Applications," 2015 European Conference on Lasers and Electro-Optics—European Quantum Electronics Conference (Optical Society of America, 2015), paper CJ_11_2, 1 page. (Jun. 21-25, 2015).
Kliner et al., "4-kW fiber laser for metal cutting and welding," *Proc. of SPIE*, 7914:791418-791418-8 (Feb. 22, 2011).
Kliner et al., "Comparison of Experimental and Theoretical Absolute Rates for Intervalence Electron Transfer," *J. Am. Chem. Soc.*, 114:8323-8325 (Oct. 7, 1992).
Kliner et al., "Comparison of Experimental and Theoretical Integral Cross Sections for D+H2(v=1, j=1)→HD(v'=1, j')+H," *J. Chem. Phys.*, 95:1648-1662 (Aug. 1, 1991).
Kliner et al., "D+$H_2$(v=1, J=1): Rovibronic State to Rovibronic State Reaction Dynamics," *J. Chem. Phys.*, 92:2107-2109 (Feb. 1, 1990).
Kliner et al., "Effect of Indistinguishable Nuclei on Product Rotational Distributions: H+HI→$H_2$+I reactions[a]," *J. Chem. Phys.*, 90:4625-4327 (Apr. 15, 1989).
Kliner et al., "Efficient second, third, fourth, and fifth harmonic generation of a Yb-doped fiber amplifier," *Optics Communications*, 210:393-398 (Sep. 15, 2002).
Kliner et al., "Efficient UV and Visible Generation Using a Pulsed Yb-Doped Fiber Amplifier," *Conference on Lasers and Electro-Optics*, OSA Technical Digest (Optical Society of America, Washington, DC), p. CPDC10-1-CPDC10-3 (May 19-22, 2002).
Kliner et al., "Efficient visible and UV generation by frequency conversion of a mode-filtered fiber amplifier," *Proc. of SPIE*, 4974:230-235 (Jul. 3, 2003).

(56) References Cited

OTHER PUBLICATIONS

Kliner et al., "Fiber laser allows processing of highly reflective materials," *Industrial Laser Solutions*, 31:1-9 (Mar. 16, 2016).
Kliner et al., "High-Power Fiber Lasers," *Photonics & Imaging Technology*, pp. 2-5 (Mar. 2017).
Kliner et al., "Laboratory Investigation of the Catalytic Reduction Technique for Detection of Atmospheric $NO_y$," *J. Geophys. Res.*, 102:10759-10776 (May 20, 1997).
Kliner et al., "Laser Reflections: How fiber laser users are successfully processing highly reflective metals," Shop Floor Lasers, available at: http://www.shopfloorlasers.com/laser-cutting/fiber/354-laser-reflections, 9 pages (Jan./Feb. 2017).
Kliner et al., "Measurements of Ground-State OH Rotational Energy-Transfer Rates," *J. Chem. Phys.*, 110:412-422 (Jan. 1, 1999).
Kliner et al., "Mode-Filtered Fiber Amplifier," Sandia National Laboratories—Brochure, 44 pages (Sep. 13, 2007).
Kliner et al., "Narrow-Band, Tunable, Semiconductor-Laser-Based Source for Deep-UV Absorption Spectroscopy," *Optics Lett.*, 22:1418-1420 (Sep. 15, 1997).
Kliner et al., "Overview of Sandia's fiber laser program," *Proceedings of SPIE—The International Society for Optical Engineering*, 6952:695202-1-695202-12 (Apr. 14, 2008).
Kliner et al., "Photodissociation and Vibrational Relaxation of $I_2^-$ in Ethanol," *J. Chem. Phys.*, 98:5375-5389 (Apr. 1, 1993).
Kliner et al., "Photodissociation Dynamics of $I_2^-$ in Solution," *Ultrafast Reaction Dynamics and Solvent Effects*, (American Institute of Physics, New York), pp. 16-35 (Feb. 1994).
Kliner et al., "Polarization-Maintaining Amplifier Employing Double-Clad, Bow-Tie Fiber," *Optics Lett.*, 26:184-186 (Feb. 15, 2001).
Kliner et al., "Power Scaling of Diffraction-Limited Fiber Sources," *Proc. of SPIE*, 5647:550-556 (Feb. 21, 2005).
Kliner et al., "Power Scaling of Rare-Earth-Doped Fiber Sources," *Proc. of SPIE*, 5653:257-261 (Jan. 12, 2005).
Kliner et al., "Product Internal-State Distribution for the Reaction H+HI→$H_2$+I," *J. Chem. Phys.*, 95:1663-1670 (Aug. 1, 1991).
Kliner et al., "The D+H2 Reaction: Comparison of Experiment with Quantum-Mechanical and Quasiclassical Calculations," *Chem. Phys. Lett.*, 166:107-111 (Feb. 16, 1990).
Kliner et al., "The H+para-H2 reaction: Influence of dynamical resonances on $H_2$(v'=1, j'=1 and 3) Integral Cross Sections," *J. Chem. Phys.*, 94:1069-1080 (Jan. 15, 1991).
Koplow et al., A New Method for Side Pumping of Double-Clad Fiber Sources, *J. Quantum Electronics*, 39:529-540 (Apr. 4, 2003).
Koplow et al., "Compact 1-W Yb-Doped Double-Cladding Fiber Amplifier Using V-Groove Side-Pumping," *IEEE Photonics Technol. Lett.*, 10:793-795 (Jun. 1998).
Koplow et al., "Development of a Narrowband, Tunable, Frequency-Quadrupled Diode Laser for UV Absorption Spectroscopy," *Appl. Optics*, 37:3954-3960 (Jun. 20, 1998).
Koplow et al., "Diode-Bar Side-Pumping of Double-Clad Fibers," *Proc. of SPIE*, 5709:284-300 (Apr. 22, 2005).
Koplow et al., "High Power PM Fiber Amplifier and Broadband Source," *Optical Fiber Communication Conference*, OSA Technical Digest (Optical Society of America, Washington, DC), p. 12-13 (Mar. 7-10, 2000).
Koplow et al., "Polarization-Maintaining, Double-Clad Fiber Amplifier Employing Externally Applied Stress-Induced Birefringence," *Optics Lett.*, 25:387-389 (Mar. 15, 2000).
Koplow et al., "Single-mode operation of a coiled multimode fiber amplifier," *Optics Letters*, 25:442-444 (Apr. 1, 2000).
Koplow et al., Use of Bend Loss to Obtain Single-Transverse-Mode Operation of a Multimode Fiber Amplifier, *Conference on Lasers and Electro-Optics*, OSA Technical Digest (Optical Society of America, Washington, DC), p. 286-287 (May 7-12, 2000).
Koplow et al., "UV Generation by Frequency Quadrupling of a Yb-Doped Fiber Amplifier," *IEEE Photonics Technol. Lett.*, 10:75-77 (Jan. 1998).
Koponen et al., "Photodarkening Measurements in Large-Mode-Area Fibers," *Proc. of SPIE*, 6453:64531E-1-64531E-12 (Feb. 2007).
Kotlyar et al., "Asymmetric Bessel-Gauss beams," *J. Opt. Soc. Am. A*, 31:1977-1983 (Sep. 2014).
Kulp et al., "The application of quasi-phase-matched parametric light sources to practical infrared chemical sensing systems," *Appl. Phys. B*, 75:317-327 (Jun. 6, 2002).
"Laser cutting machines," TRUMPF, available at: http://www.us.trumpf.com/en/products/machine-tools/products/2d-laser-cutting/innovative-technology/brightline.html, 9 pages, retrieved May 26, 2017.
"Lasers & Fibers," NKT Photonics, available at: https://www.nktphotonics.com/lasers-fibers/technology/photonic-crystal-fibers/, 4 pages, retrieved Feb. 13, 2018.
Longhi et al., "Self-focusing and nonlinear periodic beams in parabolic index optical fibres," *J. Opt. B: Quantum Semiclass. Opt.*, 6:S303-S308 (May 2004).
Maechling et al., "Sum Frequency Spectra in the C—H Stretch Region of Adsorbates on Iron," *Appl. Spectrosc.*, 47:167-172 (Feb. 1, 1993).
McComb et al., "Pulsed Yb:fiber system capable of >250 kW peak power with tunable pulses in the 50 ps to 1.5 ns. range," Proc. of SPIE, 8601:86012T-1-86012T-11 (Mar. 22, 2013).
Moore et al., "Diode-bar side pumping of double-clad fibers," Proc. of SPIE, 6453:64530K-1-64530K-9 (Feb. 20, 2007).
Neuhauser et al., "State-to-State Rates for the D+H2(v=1, j=1)→HD(v', j')+H Reaction: Predictions and Measurements," *Science*, 257:519-522 (Jul. 24, 1992).
Notice of Preliminary Rejection from the Korean Intellectual Property Office for related Application No. 10-2015-7025813, dated Jun. 26, 2018, 18 pages.
Office Action for related Chinese Application No. 201480022179.9, 5 pages, dated Mar. 30, 2017 (no English translation).
Office Action for related Korea Application No. 10-2014-0120247, dated Apr. 14, 2017, 11 pages (with English translation).
Office action from U.S. Appl. No. 15/074,838, dated May 19, 2017, 12 pages.
Office Action for related Chinese Application No. 201380075745.8, 21 pages, dated Jun. 2, 2017 (with English translation).
Office action from U.S. Appl. No. 15/607,399, dated Sep. 20, 2017, 25 pages.
Office action from U.S. Appl. No. 15/607,411, dated Sep. 26, 2017, 15 pages.
Office action from U.S. Appl. No. 15/607,410, dated Oct. 3, 2017, 32 pages.
Office Action for related Korea Application No. 10-2014-0120247, dated Oct. 18, 2017, 6 pages (with English translation).
Office action from U.S. Appl. No. 15/607,411, dated Jun. 12, 2018, 19 pages.
Office action from U.S. Appl. No. 15/607,399, dated Sep. 14, 2018, 19 pages.
Office action from U.S. Appl. No. 15/938,959, dated Jul. 18, 2018, 6 pages.
Office action from U.S. Appl. No. 15/939,064, dated Jul. 27, 2018, 7 pages.
Office action from U.S. Appl. No. 15/939,064, dated Oct. 5, 2018, 22 pages.
Office action from U.S. Appl. No. 15/938,959, dated Oct. 5, 2018, 22 pages.
Official Action for related Taiwan application No. 103130968 dated Jun. 7, 2017, 5 pages (with English translation).
Official Letter and Search Report from the Taiwan Intellectual Property Office for related Application No. 103106020, 21 pages, dated Apr. 20, 2016 (with English translation).
Official Letter and Search Report from the Taiwan Intellectual Property Office for related Application No. 102139285, 21 pages, dated Jun. 13, 2016 (with English translation.).
Official Letter and Search Report from the Taiwan Intellectual Property Office for related Application No. 102139285, 8 pages, dated Nov. 21, 2016 (with English translation).
Official Letter and Search Report from Taiwan Application No. 103130968, dated Dec. 20, 2016, 16 pages (with English translation).
Official Letter and Search Report from Taiwan Application No. 103106020, dated Jun. 6, 2017, 7 pages (with English translation).

(56) References Cited

OTHER PUBLICATIONS

PCI-6110, Multifunction I/O Device, http://www.ni.com/en-us-support/model.pci-6110.html, downloaded Dec. 15, 2017, 1 page.
Price et al., "High-brightness fiber-coupled pump laser development," Proc. of SPIE, 7583:758308-1-758308-7 (Feb. 2010).
Rinnen et al., "Construction of a Shuttered Time-of-Flight Mass Spectrometer for Selective Ion Detection," *Rev. Sci. Instrum.*, 60:717-719 (Apr. 1989).
Rinnen et al., "Effect of Indistinguishable Nuclei on Product Rotational Distributions: D+DI→$D_2$+I," *Chem. Phys. Lett.*, 169:365-371 (Jun. 15, 1990).
Rinnen et al. "Quantitative Determination of HD Internal State Distributions via (2+1) REMPI," *Isr. J. Chem.*, 29:369-382 (Mar. 7, 1989).
Rinnen et al., "Quantitative determination of $H_2$, HD, and $D_2$ internal state distributions via (2+1) resonance-enhanced multiphoton ionization," *J. Chem. Phys.*, 95:214-225 (Jul. 1, 1991).
Rinnen et al., "The H+$D_2$ Reaction: "Prompt" HD Distributions at High Collision Energies," *Chem. Phys. Lett.*, 153:371-375 (Dec. 23, 1988).
Rinnen et al., "The H+$D_2$ Reaction: Quantum State Distributions at Collision Energies of 1.3 and 0.55 eV," *J. Chem. Phys.*, 91:7514-7529 (Dec. 15, 1989).
Romero et al., "Lossless laser beam shaping," J. Opt. Soc. Am. A, 13:751-760 (Apr. 1996).
Russell, "Photonic-Crystal Fibers," IEEE JLT, 24:4729-4749 (Dec. 2006).
Saleh et al., "Chapter 9.4 Holey and Photonic-Crystal Fibers," Fundamentals of Photonics, Second Edition, pp. 359-362 (2007).
Sanchez-Rubio et al., "Wavelength Beam Combining for Power and Brightness Scaling of Laser Systems," *Lincoln Laboratory Journal*, 20:52-66 (2014).
Saracco et al., "Compact, 17 W average power, 100 kW peak power, nanosecond fiber laser system," *Proc. of SPIE*, 8601:86012U-1-86012U-13 (Mar. 22, 2013).
Schrader et al., "Fiber-Based Laser with Tunable Repetition Rate, Fixed Pulse Duration, and Multiple Wavelength Output," *Proc. of the SPIE*, 6453:64530D-1-64530D-9 (Feb. 20, 2007).
Schrader et al., "High-Power Fiber Amplifier with Widely Tunable Repetition Rate, Fixed Pulse Duration, and Multiple Output Wavelengths," *Optics Express*, 14:11528-11538 (Nov. 27, 2006).
Schrader et al., "Power scaling of fiber-based amplifiers seeded with microchip lasers," *Proc. of the SPIE*, 6871:68710T-1-68710T-11 (Feb. 2008).
Search Report from the Taiwan Intellectual Property Office for related Application No. 102139285, 21 pages, dated Sep. 1, 2015 (with English translation).
Search Report from the Taiwan Intellectual Property Office for related Application No. 102139285, 9 pages, dated Sep. 4, 2017 (with English translation).
Second Office Action from Chinese Application No. 201410455972.X, dated Nov. 22, 2016, 22 pages (with English translation).
Second Office Action from Chinese Application No. 201480019324.8, dated Nov. 16, 2017, 21 pages (with English translation).
Second Office Action from Chinese Application No. 201380075745.8, dated Feb. 26, 2018, 6 pages (with English translation).
Sheehan et al., "Faserlaser zur Bearbeitung hochreflektierender Materialien (Fiber laser processing of highly reflective materials)," *Laser*, 3:92-94 (Jun. 2017).
Sheehan et al. "High-brightness fiber laser advances remote laser processing," *Industrial Laser Solutions*, 31:1-9 (Nov. 2, 2016).
Sun et al., "Optical Surface Transformation: Changing the optical surface by homogeneous optic-null medium at will," Scientific Reports, 5:16032-1-16032-20 (Oct. 30, 2015).
Third Office Action from Chinese Application No. 201480019324.8, dated Apr. 13, 2018, 8 pages (with English translation).
Tominaga et al., "Femtosecond Experiments and Absolute Rate Calculations on Intervalence Electron Transfer in Mixed-Valence Compounds," *J. Chem. Phys.*, 98:1228-1243 (Jan. 15, 1993).
Tominaga et al., "Ultrafast Studies of Intervalence Charge Transfer," *Ultrafast Phenomena VIII*, (Springer-Verlag, New York), pp. 582-584 (1993).
"Triple Clad Ytterbium-Doped Polarization Maintaining Fibers," nuFERN Driven to Light Specifications, 1 page (Jan. 2006).
Varshney et al., "Design of a flat field fiber with very small dispersion slope," Optical Fiber Technology, 9(3):189-198 (Oct. 2003).
Wetter et al., "High power cladding light strippers," Proc. of SPIE, 6873:687327-1-687327-8 (Jan. 21, 2008).
Xiao et al., "Effects of laser modes on Nb segregation and Laves phase formation during laser additive manufacturing of nickel-based superalloy," *Materials Letters*, 188:260-262 (Nov. 1, 2016).
Xiao et al., "Fiber coupler for mode selection and high-efficiency pump coupling," Optics Letters, 38:1170-1172 (Apr. 1, 2013).
Yaney et al., "Distributed-Feedback Dye Laser for Picosecond UV and Visible Spectroscopy," Rev. Sci. Instrum, 71:1296-1305 (Mar. 2000).
Yu et al., "1.2-kW single-mode fiber laser based on 100-W high-brightness pump diodes," Proc. of SPIE, 8237:82370G-1-82370G-7 (Feb. 16, 2012).

\* cited by examiner

BACK-REFLECTION PROTECTION AND MONITORING IN FIBER AND FIBER-DELIVERED LASERS

CROSS REFERENCE TO RELATED APPLICATION

This application is a continuation of U.S. application Ser. No. 14/816,211, filed Aug. 3, 2015, which claims the benefit of U.S. Provisional Application No. 62/032,043, filed on Aug. 1, 2014, both of which are hereby incorporated by reference in their entirety.

FIELD

The disclosure pertains to back-reflection protection in fiber and fiber-delivered laser systems.

BACKGROUND

High-power industrial laser systems generally produce beams having output powers in the range of several hundreds of Watts to several kW. It is often desirable to deliver the laser power to a processing head or work piece via an optical fiber. Laser systems that can be coupled into an optical fiber for delivery include fiber lasers, disk lasers, and diode- or lamp-pumped solid-state lasers (e.g., Nd:YAG). In these systems, the desired optical power is guided in the fiber core, but some power may also be present in the fiber cladding; this cladding light is undesirable because it can cause excessive heating of or damage to downstream components or optics, or it may otherwise interfere with work piece processing.

In typical fiber laser systems a signal beam is created in an active fiber that includes a rare-earth doped optical fiber core by delivering a pump beam to a cladding of the active fiber at a pump wavelength that is shorter than a signal beam wavelength. At the output of the fiber laser, cladding light may consist of unabsorbed pump light and signal light that has escaped from the core. For both fiber lasers and other lasers, cladding light may be introduced into a beam delivery fiber if launching of the laser beam couples some of the light into the cladding rather than the core. A processing beam directed to a target or work piece can experience reflection or scattering and can become back-coupled into the beam delivery fiber. This back-coupled light can be coupled into both the active or beam delivery fiber core and cladding, and can destabilize, damage, or otherwise interfere with the laser system.

Accordingly, systems that can remove and monitor both forward-propagating and backward-propagating cladding light and backward-propagating core light are needed, particularly to protect against high-power back-reflections.

SUMMARY

According to one aspect a system includes an optical fiber situated to propagate a laser beam received from a laser source to an output of the optical fiber, a first cladding light stripper optically coupled to the optical fiber and situated to extract at least a portion of forward-propagating cladding light in the optical fiber, and a second cladding light stripper optically coupled to the optical fiber between the first cladding light stripper and the optical fiber output and situated to extract at least a portion of backward-propagating cladding light in the optical fiber.

According to another aspect, a method includes directing a material processing laser beam from a laser source from an output end of a beam delivery fiber to a target, receiving a returned portion of the material processing laser beam returned from the target, coupling the returned portion into the beam delivery fiber, extracting cladding light associated with the material processing laser beam in a first cladding light stripper optically coupled to the beam delivery fiber, and extracting cladding light associated with the returned portion of the material processing laser beam in a second cladding light stripper optically situated between the first cladding light stripper and the output end of the beam delivery fiber.

According to another aspect, a method includes detecting a characteristic associated with backward-propagating cladding light extracted with a cladding light stripper from a beam delivery fiber delivering a laser beam generated with a laser source, detecting a characteristic associated with backward-propagating core light in the beam delivery fiber, and adjusting one or more laser system characteristics in response to one or more of the detected backward-propagating cladding light and backward-propagating core light characteristics.

According to another aspect, a system includes a first cladding light stripper disposed between a laser source and a beam delivery fiber output situated in relation to a target, the first cladding light stripper situated to receive a material processing beam and to extract forward-propagating cladding light associated with the material processing beam from the beam delivery fiber, and a second cladding light stripper disposed between the first cladding light stripper and the beam delivery fiber output and situated to receive the material processing beam from the first cladding light stripper and to receive backward-propagating cladding light associated with the target, the second cladding light stripper situated to extract backward-propagating cladding light from the beam delivery fiber.

According to another aspect, a laser feedback monitoring system in a high-power laser system is provided, the high-power laser system configured to produce a laser beam from a laser source and to emit the laser beam from a delivery fiber output and to direct the emitted beam to a target, with the laser feedback monitoring system including a first cladding light stripper situated between the laser source and the delivery fiber output to receive the laser beam and to remove cladding light associated with the beam, a second cladding light stripper situated between the first cladding light stripper and the delivery fiber output to receive the beam from the first cladding light stripper and to remove residual cladding light associated with the beam and to receive light back-reflected from the target and coupled back into the delivery fiber output and to remove back-reflected cladding light, and at least one back-reflected cladding light detector coupled to the second cladding light stripper for detecting characteristics of the back-reflected cladding light.

The foregoing and other objects, features, and advantages will become more apparent from the following detailed description, which proceeds with reference to the accompanying figures.

DETAILED DESCRIPTION

Figure 1:
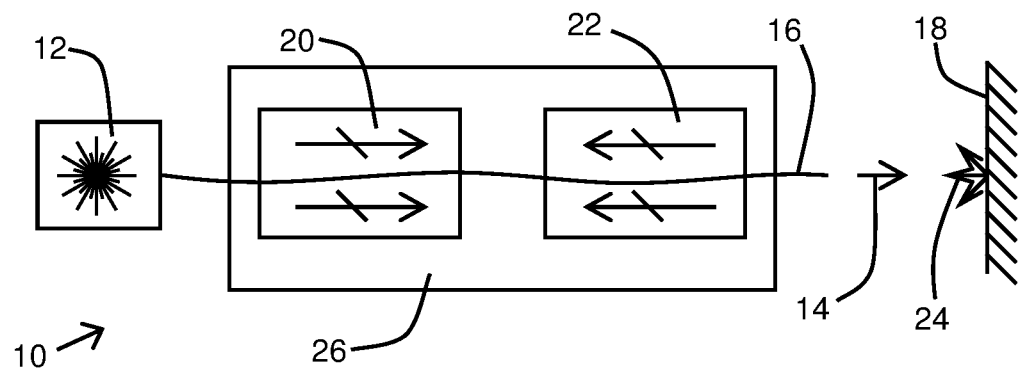
FIG. 1 is a schematic of an embodiment of a laser system with back-reflection protection.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections. Examples are described with reference to directions indicated as "above," "below," "upper," "lower," and the like. These terms are used for convenient description, but do not imply any particular spatial orientation.

As used herein, optical radiation refers to electromagnetic radiation at wavelengths of between about 100 nm and 10 µm, and typically between about 500 nm and 2 µm. Examples based on available laser diode sources and optical fibers generally are associated with wavelengths of between about 800 nm and 1700 nm. In some examples, propagating optical radiation is referred to as one or more beams having diameters, asymmetric fast and slow axes, beam cross-sectional areas, and beam divergences that can depend on beam wavelength and the optical systems used for beam shaping. For convenience, optical radiation is referred to as light or beams in some examples, and need not be at visible wavelengths. Forward-propagating light or optical beams or beam portions refer to light, beams, or beam portions that propagate in a common direction with a processing beam that is directed to a target. Backward-propagating light or optical beams or beam portions refer to light, beams, or beam portions that propagate in a common and opposite direction of a processing beam that is directed to a target.

Representative embodiments are described with reference to optical fibers, but other types of optical waveguides can be used having square, rectangular, polygonal, oval, elliptical or other cross-sections. Optical fibers are typically formed of silica (glass) that is doped (or undoped) so as to provide predetermined refractive indices or refractive index differences. In some, examples, fibers or other waveguides are made of other materials such as fluorozirconates, fluoroaluminates, fluoride or phosphate glasses, chalcogenide glasses, or crystalline materials such as sapphire, depending on wavelengths of interest. Refractive indices of silica and fluoride glasses are typically about 1.5, but refractive indices of other materials such as chalcogenides can be 3 or more. In still other examples, optical fibers can be formed in part of plastics. In typical examples, a doped waveguide core such as a fiber core provides optical gain in response to pumping, and core and claddings are approximately concentric. In other examples, one or more of the core and claddings are decentered, and in some examples, core and cladding orientation and/or displacement vary along a waveguide length.

As used herein, numerical aperture (NA) refers to a largest angle of incidence with respect to a propagation axis defined by an optical waveguide for which propagating optical radiation is substantially confined. In optical fibers, fiber cores and fiber claddings can have associated NAs, typically defined by refractive index differences between a core and cladding layer, or adjacent cladding layers, respectively. While optical radiation propagating at such NAs is generally well confined, associated electromagnetic fields such as evanescent fields typically extend into an adjacent cladding layer. In some examples, a core NA is associated with a core/inner cladding refractive index, and a cladding NA is associated with an inner cladding/outer cladding refractive index difference. For an optical fiber having a core refractive index $n_{core}$ and a cladding index $n_{clad}$, a fiber core NA is NA=$\sqrt{n^2_{core}-n^2_{clad}}$. For an optical fiber with an inner core and an outer core adjacent the inner core, a cladding NA is NA=$\sqrt{n^2_{inner}-n^2_{outer}}$, wherein $n_{inner}$ and $n_{outer}$ are refractive indices of the inner cladding and the outer cladding, respectively. Optical beams as discussed above can also be referred to as having a beam NA which is associated with a beam angular radius. While multi-core step index fibers are described below, gradient index designs can also be used.

In the examples disclosed herein, a waveguide core such as an optical fiber core is doped with a rare earth element such as Nd, Yb, Ho, Er, or other active dopants or combinations thereof. Such actively doped cores can provide optical gain in response to optical or other pumping. As disclosed below, waveguides having such active dopants can be used to form optical amplifiers, or, if provided with suitable optical feedback such as reflective layers, mirrors, Bragg gratings, or other feedback mechanisms, such waveguides can generate laser emissions. Optical pump radiation can be arranged to co-propagate and/or counter-propagate in the waveguide with respect to a propagation direction of an emitted laser beam or an amplified beam.

The term brightness is used herein to refer to optical beam power per unit area per solid angle. In some examples, optical beam power is provided with one or more laser diodes that produce beams whose solid angles are proportional to beam wavelength and beam area. Selection of beam area and beam solid angle can produce pump beams that couple selected pump beam powers into one or more core or cladding layers of double, triple, or other multi-clad optical fibers.

Referring now to FIG. 1, a high-power laser system with feedback protection 10 includes a laser source 12 situated to couple an optical beam into a delivery fiber 16 as a guided optical beam that exits the deliver fiber 16 as an output beam 14. The output beam 14 is typically directed to a target 18 such as a metal, glass, semiconductor or other material substrate. A first cladding light stripper 20 is optically coupled to the delivery fiber 16 so as to remove, or strip, primarily forward-propagating cladding light (i.e., light propagating towards the target 18) from the guided beam. A second cladding light stripper 22 is optically coupled between the first cladding light stripper 20 and the output of the delivery fiber 16 so as to remove, or strip, primarily backward-propagating cladding light (i.e., light propagating form the output of the delivery fiber 16 toward the laser source 12). The forward-propagating cladding light is generally associated with unabsorbed or unconverted pump light and portions of the output beam that has leaked out of a core of the delivery fiber 16. The backward-propagating cladding light is generally associated with portions of the output beam 14 that are back-coupled into the delivery fiber 16 due to scattering, reflection, or other effects.

A returned beam portion 24 that is coupled into the output of the delivery fiber 16 is generally undesirable and can destabilize the laser system 10 or cause laser system degradation and failure. By arranging a pair of cladding light strippers, such as the first and second cladding light strippers 20, 22, laser systems such as the laser system 12 can be provided with robust protection from back-reflection. In particular, the second cladding light stripper 22, which is more proximal to the output of the delivery fiber 16 as shown in FIG. 1, substantially removes portions of the output beam 14 that are coupled into the delivery fiber 16 as cladding light, while forward-propagating cladding light associated with the output beam 14 and pump beams is substantially attenuated by the first cladding light stripper 20, situated more distal from the output of the delivery fiber 16 than the second cladding light stripper 22. This removal of cladding light allows a portion of the delivery fiber 16 between the first and second cladding light strippers 20, 22 to be substantially without cladding light. Thus, the backward-propagating cladding light can be isolated or mostly isolated, and therefore distinguishable, from the forward-propagating cladding light.

The cladding light strippers 20, 22 can also be conveniently arranged in close proximity to each other and still retain optical or thermal isolation. For example, in some embodiments, the cladding light strippers 20, 22 can be separated and separately or jointly cooled or otherwise thermally managed. In other embodiments, the cladding light strippers 20, 22 are disposed on a common heat sink block 26 which is actively cooled with one or more cooling devices coupled to the heat sink block 26. Depending on the design of the cladding light strippers 20, 22, forward-propagating cladding light may also be partially removed by the second cladding light stripper 22, and backward-propagating cladding light may also be partially removed by the first cladding light stripper 20. Forward-propagating cladding light is generally undesirable because it can cause heating or damage to components downstream from the fiber laser, e.g., to the delivery cable or to optical systems employed to deliver the laser beam to the work piece.

Depending on the output power of the output beam 14 (which can be as little as 0.5 kW or less to as much as 10 kW or more) and other attributes of the high-power laser system 10, various forward-propagating cladding light and back-coupled light power contents can be expected during operation. For example, the laser system 10 configured to generate the output beam 14 with an output power of around 3 kW can include 300 W or more of forward-propagating cladding light that should be coupled out of the delivered beam 14 and dissipated to prevent system destabilization. Theoretically, up to the entirety of the output beam 14 could be back-reflected and coupled back into the output of the delivery fiber 16, though 100% back-coupling may be unlikely. With the 3 kW output beam 14, in typical examples approximately 300 W can be expected to become back-coupled, however the portion of the output beam 14 that is back-reflected, the variability of the portion, and the time dependence of the portion can be dependent on the application in which the high-power laser system output beam 14 is being used. Accordingly, back-coupled light and backward-propagating cladding light can range from being continuous to highly transient. In some system examples, 100 W or more of continuous forward-propagating cladding light is removed and 100 W or more of transient backward-propagating cladding light is removed. The cladding light strippers 20, 22 are thus operable to remove the cladding light and the removed light can be dumped in some manner, such as with a conductive sink like conductive block 26.

Figure 2:
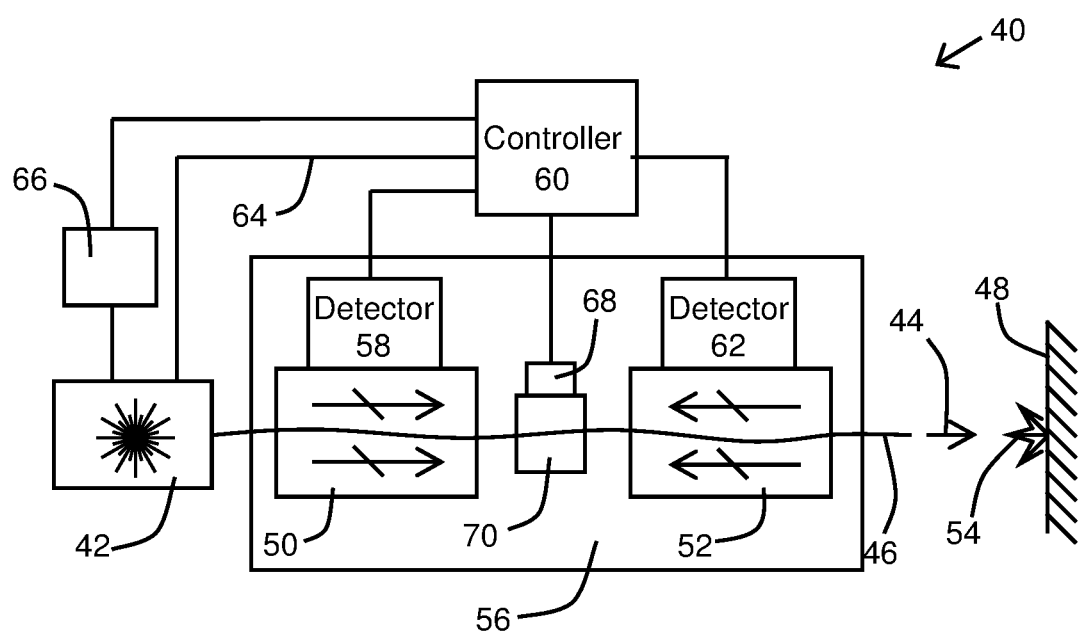
FIG. 2 is a schematic of another embodiment of laser system with back-reflection protection.

Referring now to FIG. 2, a high power laser system with feedback protection 40 includes a laser source 42 that generates a fiber-coupled laser beam 44 which is typically a high-power beam for material processing applications, and a delivery fiber 46 that directs the beam 44 to a target 48. A first cladding light stripper 50 is situated to remove a portion (e.g., 80%, 90%, 95%, 99%) or all forward-propagating cladding light from the beam 44 as the forward-propagating cladding light propagates towards the output of the delivery fiber 46. A second cladding light stripper 52 is located in the beam path between the first cladding light stripper 50 and the output of the delivery fiber 46 so as to remove a portion (e.g., 80%, 90%, 95%, 99%) or all backward-propagating cladding light that is typically associated with returned beam portions 54 from the target 48. If less than the entire amount of forward-propagating cladding light is removed by the first cladding light stripper 50, then the second cladding light stripper 52 can remove all or most of the remaining portion. Similarly, if less than the entire amount of backward-propagating cladding light is removed by the second cladding light stripper 52, the first cladding light stripper 50 can remove all or most of the remaining portion. The cladding light strippers 50, 52 are conveniently coupled to a conductive block 56 which can be configured for active cooling.

The laser system 40 also includes a stripped forward-propagating cladding light detector 58 coupled to the first cladding light stripper 50. The detector 58 is situated to detect one or more characteristics associated with the forward-propagating cladding light, such as power, wavelength, temporal characteristics (e.g., power variation, pulse duration, pulse repetition rate), temperature in proximity to the stripper 50, etc., and provides an associated detection signal to a system controller 60. The detector 58 can include one sensor for detecting a particular characteristic, one sensor for detecting a plurality of characteristics, or a plurality of sensors for detecting the same or different characteristics. In some examples, the first cladding light stripper 50 includes a volume formed in the conductive block 56, such as an integrating volume. The forward-propagating cladding light propagates along a fiber situated in the volume, such as a portion of the beam delivery fiber 46 or another fiber or fiber portion coupled to the beam delivery fiber 46. One or more sensors associated with the detector 58 can be situated in or near the volume so as to generate detection signals to detect forward-propagating cladding light characteristics. To moderate detected characteristics of cladding light, one or more optical filters may be used. Detected characteristics can also include specular or diffuse reflections of cladding light extracted from the optical fiber in which the forward-propagating cladding light is propagating.

The laser system 40 further includes a stripped backward-propagating cladding light detector 62 coupled to the second cladding light stripper 52 which detects one or more characteristics associated with the backward-propagating cladding light, such as power, wavelength, temporal characteristics, temperature, etc. In some examples, the detector 62 (and/or detector 58) can include one or more of a thermistor, thermal switch, and photodiode. The output of the detector 62 is also coupled to the controller 60. Because most or all of the forward-propagating cladding light associated with the beam 44 is removed by the forward-propagating cladding light stripper 50, the detector 62 is situated to detect back-reflected characteristics without the characteristics becoming tainted, skewed, or muddled by the forward-propagating cladding light energy. Similarly, since most or all of the backward-propagating cladding light energy is removed by the backward-propagating cladding light stripper 52, the process of detecting forward-propagating cladding light characteristics experiences improved accuracy in the presence of back-reflected light.

The system controller 60 is situated to receive one or more such detection signals that can be associated with corresponding beam characteristics and can initiate different system actions in response. For example, controller 60 is shown to be coupled with control output 64 to laser source 42. Based on the detected characteristics from detectors 58, 62, a laser interlock procedure can be executed that triggers a power disconnect or an adjustment of power level or some other characteristic associated with the laser system 40, including the laser source 42 and the output beam 44. For example, if the backward-propagating cladding light power or an associated temperature is excessive, the laser source 42 can be turned off, or a warning can be issued to the user. Abnormal increases or decreases of the forward-propagating cladding power may indicate a malfunction of the laser system, which can result in turning off the laser source 42 or issuing a warning to a user. In other examples, laser source 42 output power can be varied to compensate for a detected variation in forward-propagating cladding energy. Other laser system characteristics can be adjusted as well, including cooling system characteristics (e.g., fluid flow-rates, power level, etc.).

The cladding light strippers 50, 52 typically couple only cladding light, or poorly coupled cladding light, out of the optical delivery fiber 46. Both the forward- and backward-propagating core light associated with beam propagation in the delivery fiber 46 is generally unaffected. Backward-propagating core light can also lead to system degradation and failure, and the system controller 60 can be coupled to a backward-propagating core light detector 66, that is coupled to the laser source 42 and detects one or more characteristics associated with backward-propagating core light. The interlock control 64 of the controller 66 can also be configured to disconnect or adjust power or another laser system characteristic associated with the laser source 42. In some embodiments, detected cladding light and core light characteristics can include spectral characteristics, allowing deeper insights into system operation and particular application effects, and enabling a spectral-based interlock for the system 40 or spectral-based adjustment of laser system characteristics, including output beam power, pump source power, and temporal features.

In some examples, a detector 68 is coupled to the optical fiber 46 propagating the output beam 44 between the first and second cladding light strippers 50, 52. Because most or all of the forward and backward-propagating cladding light is removed by the strippers 50, 52, the length of optical fiber 46 extending between the strippers 50, 52 provides a location suitable to detect characteristics of core light associated with the propagating output beam 44 such that detection experiences less interference associated with forward or backward cladding light energy. In one example, a core light power characteristic is detected with detector 68 coupled to a core light detection chamber 70 without interfering with propagating beam 44 by receiving light scattered out of the core. The light detection chamber 70 can serve as an optical integrating volume such that detector 68 receives a multiply reflected, integrated characteristic of the scattered core light. In another example, the detector 68 is coupled so as to directly receive the scattered core light or one or more mirrors or lenses can be used to concentrate and direct the scattered core light to the detector 68. In a further example, an optical splice is disposed on the optical fiber 46 in the detection chamber 70. The detector 68 can then detect optical loss associated with the propagation of light through the optical splice, and such loss can vary in relation to the optical power and wavelength of the beam 44 propagating in the core of the fiber. It will be appreciated that various features of detectors 58, 62, 68 as well as the detected characteristics can be used together.

In various examples, values of particular detected optical characteristics can provide the actual or close to the actual characteristic sought, or the values can be empirically or observationally matched to different expected or actual characteristics. For example, the laser system can be operated at selected power levels and an output beam can be measured both in the presence and absence of cladding light strippers or other system components to determine the amount of cladding light that is removed and corresponding detected values. A table can be generated, and a function fitted to the table values, associating the different detected characteristics in relation to the actual characteristics.

Cladding light strippers can be made in a variety of ways. Some examples of cladding light strippers utilize an epoxy that surrounds an exposed cladding surface of an optical fiber in which an output beam and cladding light are propagating. Because the fiber cladding is coupled to an epoxy with selected refractive index and other characteristics, cladding light is successively stripped along the length of the epoxy-cladding interface. In other examples of cladding light strippers, the optical fiber includes one or more notches or other patterns ("microstructures") penetrating the circumference of the exposed cladding. The notches are operable to disrupt the propagating cladding light by directing the cladding light away from and out of the optical fiber without substantially affecting the light propagating in the fiber core. The out-coupled cladding light then impacts an adjacent surface of a conductive block and is eventually converted to heat, which dissipates through the conductive block. In other examples of cladding light strippers, silica-based crystals are formed on the cladding surface to scatter the cladding light out of the fiber without substantially affecting the light propagating in the fiber core.

Figure 3:
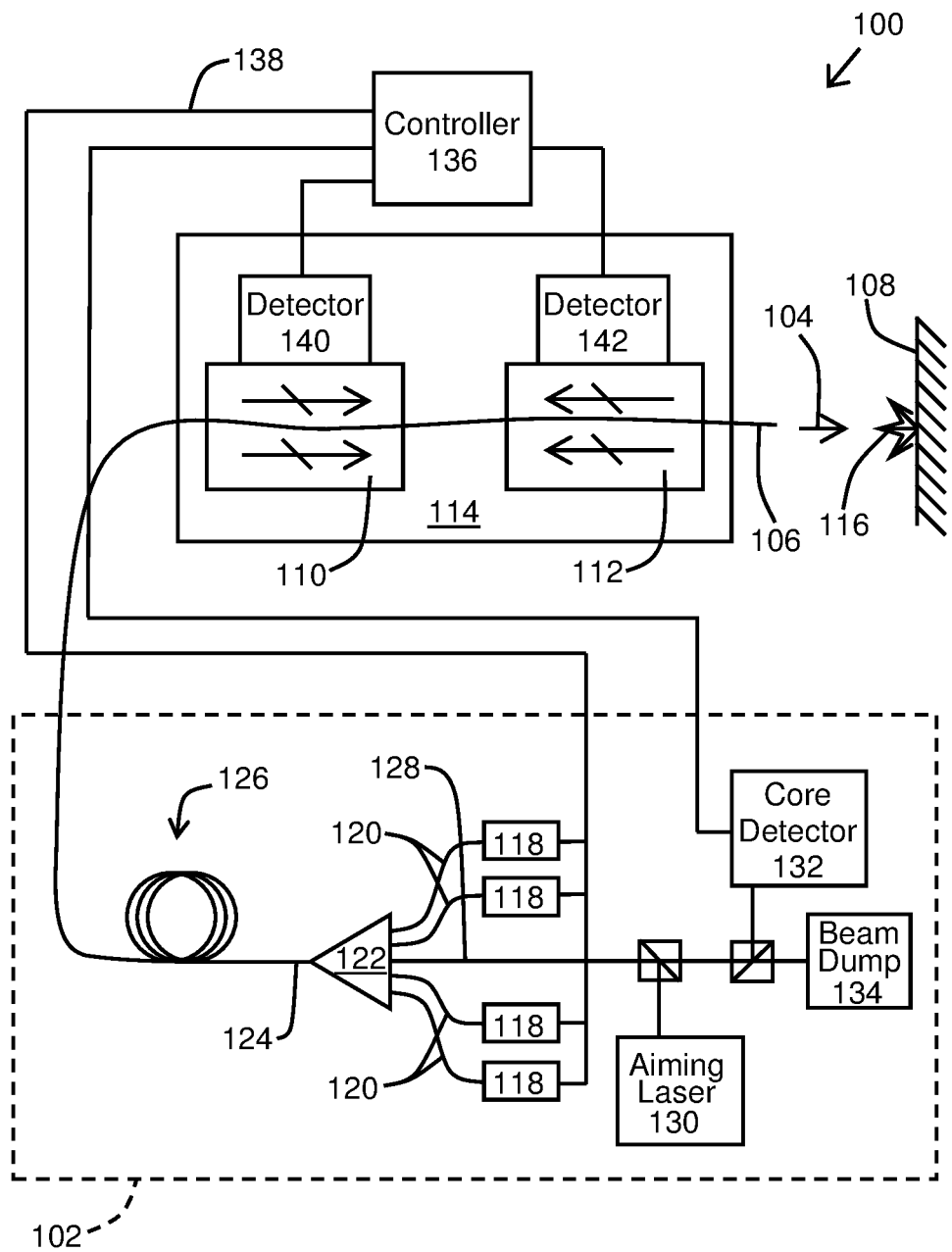
FIG. 3 is a schematic of another embodiment of a laser system with back-reflection protection.

Referring to FIG. 3 there is shown another example of a high power laser system 100 with back-reflection protection. System 100 includes laser source 102 capable of generating a high-power fiber-coupled laser beam 104, which is emitted from an output of a delivery fiber 106 towards a target 108. System 100 further includes first and second cladding light strippers 110, 112 disposed on a cooling block 114 and in relation to the output of the delivery fiber 106. The first cladding light stripper 110 removes all or most of forward-propagating cladding light typically associated with residual pump light and signal light lost from the core of the laser source 102, while second cladding light stripper 112 removes all or most of backward-propagating cladding light typically associated with light 116 reflected at the target and back-coupled into the output of the delivery fiber 106.

Laser source 102 is expanded to show an example of a laser source herein suitable for generating the high power fiber-coupled output beam 104. It will be appreciated that a variety of types and variations of laser sources are possible that can be configured to produce a fiber-delivered high power output beam, including laser sources configured to detect different operating system characteristics and to receive different control commands. Other examples of suitable laser sources include fiber lasers, fiber amplifiers, disk lasers, diode-pumped solid-state lasers, lamp-pumped lasers, and direct-diode lasers, each of which can be configured to operate at a wavelength that can be transmitted to the processing head or work piece using an optical fiber.

As shown, the exemplary laser source 102 includes a plurality of pump modules 118 that produce pump beams at a pump wavelength and couple the pump beams into a pump delivery fiber 120. The plurality of pump delivery fibers 120 is coupled to a pump or pump-signal combiner 122 which combines received pump light into a combined pump output 124. The output 124 is coupled to a fiber laser oscillator 126 that generates the output beam 104 in an active core of the fiber oscillator using the coupled pump light. The pump delivery fibers 120 are arranged in various configurations about an input of the combiner 122. An additional fiber 128 is coupled to a center position of the input of the combiner 122 and can be coupled to one or more components, including an aiming laser 130, a detector 132, or a beam dump 134. The aiming laser 130 emits an aiming beam which can assist with the use of the system 100 by showing the expected location for the beam 104 at the target 108. The center position occupied with the additional fiber 128 is also convenient for detection and removal of core light that is not contained by the oscillator 126. In particular, back-reflected light 116 that is coupled into the core of the delivery fiber 106 may not be removed by the cladding light strippers 110, 112 and can propagate through to the laser source 102.

The core detector 132 is thus situated to detect characteristics associated with core light propagating past the combiner 122 and to provide the detected characteristics to a system controller 136. Based in part or in whole on the received characteristics, the controller 136 can adjust other system characteristics, such as the power level supplied to the pump modules 118 using controller output 138, in order to protect or enhance system 100 performance. Moreover, the central position of the fiber 128 of the combiner 122 ensures most or all of the core light received by the combiner 122 from the direction of the oscillator 126 is directed into the fiber 128, which can then be detected with core light detector 132 and removed with beam dump 134. A detector 140 which detects forward-propagating cladding light is coupled to the first cladding light stripper 110 and provides information about forward-propagating cladding light characteristics to the controller 136. A detector 142 which detects backward-propagating cladding light is coupled to the second cladding light stripper 112 and provides information about backward-propagating cladding light characteristics to the controller 136. Independently or in concert, the detectors 132, 140, 142 can detect beam and system characteristics that can be utilized to optimize, protect, or otherwise enhance performance of laser system 100.

Figure 4:
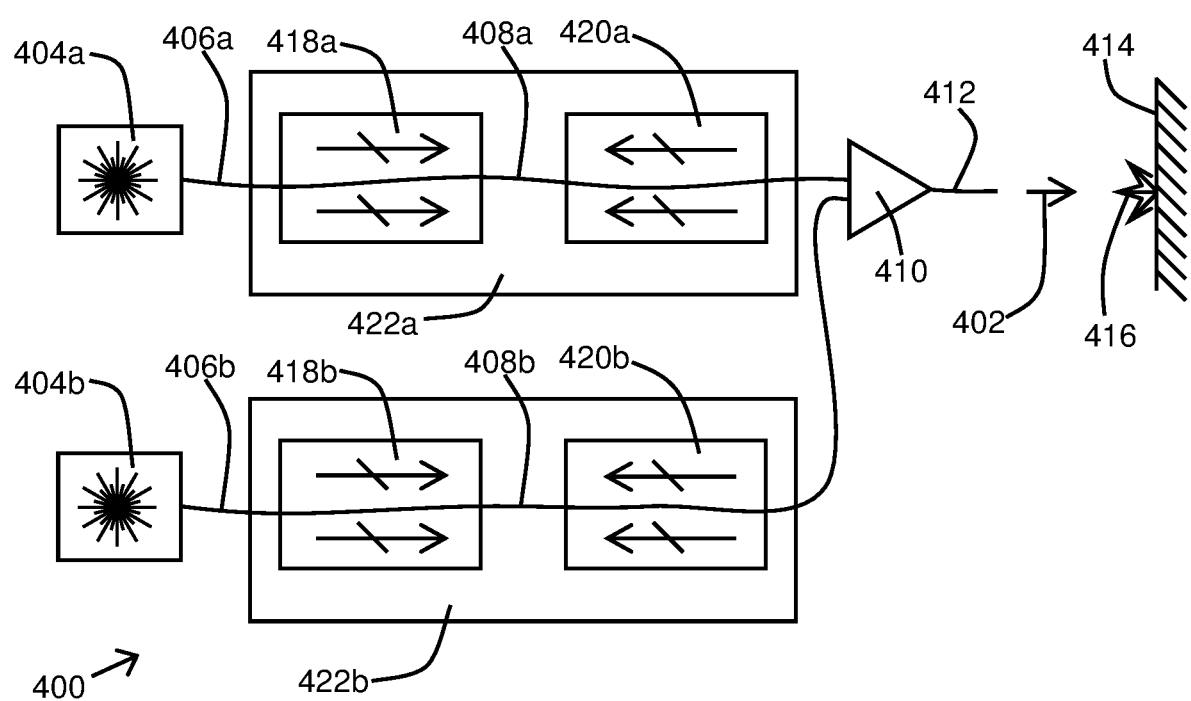
FIG. 4 is a schematic of another embodiment of a laser system with back-reflection protection.

In FIG. 4 an exemplary laser system 400 that emits a combined laser beam 402 is shown. The laser system 400 includes laser sources 404a, 404b each situated to produce a respective forward-propagating laser beam 406a, 406b coupled to a respective receiving fiber 408a, 408b. The forward-propagating laser beams 406 are coupled to a beam combiner 410 that combines and couples the forward-propagating laser beams 406 into an output fiber 412 that emits the combined laser beam 402. The combined laser beam 402 is incident on a target 414 and a beam portion 416 associated with the beam 402 is typically reflected by the target 414. Some of the beam portion 416 that becomes reflected can couple into the output fiber 412 and backward-propagate in the receiving fibers 408. Forward propagating cladding light strippers 418a, 418b are optically coupled to the respective receiving fiber 408 so as to extract at least a portion of forward-propagating cladding light, such as unused pump light associated with the respective laser sources 404. Backward-propagating cladding light strippers 420a, 420b are optically coupled to the respective receiving fiber 408 so as to extract at least a portion of backward-propagating cladding light, such as light that is coupled back into the output fiber 412. The cladding light strippers 418, 420 are coupled to respective conductive blocks 422a, 422b so as to dissipate the heat associated with the extracted cladding light. In further examples, the strippers 418, 420 can be coupled to the same cooling block. In additional examples, the forward-propagating cladding light strippers 418 can be situated in a common volume associated with a cooling block and the backward-propagating cladding light strippers 420 can be situated in a common volume associated with a cooling block.

In view of the many possible embodiments to which the principles of the disclosed technology may be applied, it should be recognized that the illustrated embodiments are only representative examples and should not be taken as limiting the scope of the disclosure. Alternatives specifically addressed in these sections are merely exemplary and do not constitute all possible alternatives to the embodiments described herein. For instance, various components of systems described herein may be combined in function and use. We therefore claim all that comes within the scope and spirit of the appended claims.

I claim:

1. A system, comprising:
   an optical fiber situated to propagate a laser beam received from a laser source to an output of the optical fiber;
   a first cladding light stripper optically coupled to the optical fiber and situated to extract at least a portion of forward-propagating cladding light in the optical fiber; and
   a second cladding light stripper optically coupled to the optical fiber between the first cladding light stripper and the optical fiber output and situated to extract at least a portion of backward-propagating cladding light in the optical fiber;

wherein the optical coupling of the optical fiber to the first cladding light stripper is spaced apart from the optical coupling of the optical fiber to the second cladding light stripper by an optical fiber portion having a length such that the optical fiber portion is substantially without forward propagating cladding light along the entire length of the optical fiber portion.

2. The system of claim 1, further comprising:
a heat sink situated to receive and absorb the forward-propagating cladding light and the backward-propagating cladding light extracted by the first and second cladding light strippers, respectively.

3. The system of claim 1, further comprising:
an optical detector optically coupled to the optical fiber portion and configured to detect a core light substantially free of forward propagating cladding light.

4. The system of claim 1, wherein the laser source includes a core light detector optically coupled to the optical fiber to detect a backward propagating core light.

5. The system of claim 4, wherein the laser source includes a combiner having a central input and one or more other inputs adjacent to the central input, wherein the core light detector is optically coupled to the central input of the combiner to detect the backward-propagating core light.

6. A system, comprising:
a laser source including a combiner having a central input and one or more other inputs adjacent to the central input, and including a beam dump coupled to the central input of the combiner;
a first cladding light stripper disposed between the laser source and a beam delivery fiber output situated in relation to a target, the first cladding light stripper situated to receive a material processing beam and to extract forward-propagating cladding light associated with the material processing beam from the beam delivery fiber; and
a second cladding light stripper disposed between the first cladding light stripper and the beam delivery fiber output and situated to receive the material processing beam from the first cladding light stripper and to receive and extract backward-propagating cladding light from the beam delivery fiber.

7. The system of claim 6, further comprising:
a core light detector coupled between the first and second cladding light strippers to detect a material processing beam core light power level.

8. The system of claim 7, wherein the core light detector is situated to receive core light associated with an optical splice that is positioned between the first and second cladding light.

9. The system of claim 6, further comprising:
a detector coupled to the second cladding light stripper and situated to detect one or more characteristics associated with the backward-propagating cladding.

10. The system of claim 9, wherein the characteristics associated with the backward-propagating cladding light include one or more of temporal, spectral, thermal, and power characteristics.

11. The system of claim 9, further comprising:
a laser interlock coupled to the detector so as to receive the characteristics associated with the backward-propagating cladding light from the detector and responsive to adjust characteristics of the material processing beam based on the characteristics associated with the backward-propagating cladding light.

12. The system of claim 9, wherein the detector includes one or more of a thermistor, thermal switch, and photodiode.

13. The system of claim 6, further comprising a core light detector optically coupled to the central input of the combiner and situated to detect backward-propagating core light.

14. The system of claim 13, further comprising a laser system aiming laser coupled to the central input of the combiner.

15. The system of claim 13, wherein the combiner is a pump or pump-signal combiner.

16. A system, comprising:
a laser source including a combiner having a central input and one or more other inputs adjacent to the central input, and including an aiming laser coupled to the central input of the combiner;
a first cladding light stripper disposed between the laser source and a beam delivery fiber output situated in relation to a target, the first cladding light stripper situated to receive a material processing beam and to extract forward-propagating cladding light associated with the material processing beam from the beam delivery fiber; and
a second cladding light stripper disposed between the first cladding light stripper and the beam delivery fiber output and situated to receive the material processing beam from the first cladding light stripper and to receive and extract backward-propagating cladding light from the beam delivery fiber.

17. The system of claim 16, further comprising a core light detector optically coupled to the central input of the combiner and situated to detect backward-propagating core light.

18. The system of claim 17, further comprising a laser interlock configured to adjust characteristics of the material processing beam based on the characteristics associated with detected backward-propagating core light.

19. The system of claim 16, further comprising a beam dump coupled to the central input of the combiner.

20. The system of claim 16, wherein the combiner is a pump or pump-signal combiner.

* * * * *